United States Patent [19]

Westlake et al.

[11] B 3,923,880

[45] Dec. 2, 1975

[54] CATALYSTS AND CATALYTIC PROCESSES

[75] Inventors: David Jack Westlake, Ewell, Epsom; Michael John Wriglesworth, Horsham, both of England

[73] Assignee: BP Chemicals International Limited, London, England

[22] Filed: Oct. 10, 1972

[21] Appl. No.: 295,860

[44] Published under the Trial Voluntary Protest Program on January 28, 1975 as document no. B 295,860.

[30] Foreign Application Priority Data
Oct. 20, 1971 United Kingdom............... 48777/71
Dec. 20, 1971 United Kingdom............... 58991/71

[52] U.S. Cl........... 260/532; 260/410.9 R; 260/413; 260/488 K; 260/540; 260/541
[51] Int. Cl.²................C07C 51/12; C07C 51/10; C07C 67/00
[58] Field of Search.......... 260/532, 488 K, 533 AN

[56] References Cited
UNITED STATES PATENTS

| | | | |
|---|---|---|---|
| 2,593,440 | 4/1952 | Hagenneyer | 260/532 |
| 3,437,676 | 4/1969 | Kutepow et al. | 260/532 |
| 3,641,076 | 2/1972 | Booth | 260/533 AN |
| 3,700,706 | 10/1972 | Butter | 260/533 AN |
| 3,733,362 | 5/1973 | Biale | 260/533 AN |
| 3,769,324 | 11/1973 | Paulik et al. | 260/532 |
| 3,769,329 | 11/1973 | Paulik et al. | 260/532 |
| 3,772,380 | 11/1973 | Paulik et al. | 260/532 |

FOREIGN PATENTS OR APPLICATIONS

| | | | |
|---|---|---|---|
| 837,643 | 3/1970 | Canada | 260/532 |

*Primary Examiner*—Lorraine A. Weinberger
*Assistant Examiner*—Richard D. Kelly
*Attorney, Agent, or Firm*—Brooks Haidt Haffner & Delahunty

[57] ABSTRACT

Alcohols and alcohol derivatives are carbonylated to carboxylic acids using as catalyst a cationic complex of rhodium or iridium wherein the anionic moiety of the cationic complex is a radical other than a halide.

14 Claims, No Drawings

CATALYSTS AND CATALYTIC PROCESSES

The present invention relates to cationic complexes of Group VIII metals and the use thereof in the carbonylation of alcohols.

It is well known to produce carboxylic acids by the reaction of alcohols with carbon monoxide in the presence of a catalyst. The catalysts reported in literature for such syntheses include phosphoric acid, phosphate, heavy metal salts such as zinc and cuprous chlorides, silicates of various metals and boron trifluoride in various hydration states. However, when these catalysts are employed severe reaction conditions are required to effect the carbonylation. For example, elevated temperatures and pressures of the order of 400°C and 10,000 psig respectively have to be employed. Even under such severe conditions the yields of acid are poor and hence the process is uneconomical. The use of metal carbonyls such as those of iron, cobalt and nickel as catalysts for this reaction have also been reported. Although, these catalysts demand less severe reaction conditions, the yield of the desired carboxylic acid is substantially poorer and the reaction rates are slow compared with the process of the present invention.

It is therefore an object of the present invention to overcome the above disadvantages and thus provide an improved process for the production of carboxylic acids.

Accordingly, the present invention is a process for the carbonylation of an alcohol and/or an alcohol derivative containing from 1 to 20 carbon atoms per molecule in the alcohol moiety to produce a carboxylic acid having one more carbon atom per molecule than that in the alcohol moiety of the alcohol or alcohol derivative as here after defined comprising reacting the alcohol and/or alcohol derivative with the carbon monoxide at elevated temperatures in the presence of a cationic complex of rhodium or iridium as catalyst and wherein the anionic moiety in the cationic complex catalyst is a radical other than a halide.

The alcohols or alcohol derivatives, containing from 1 to 20 carbon atoms in the alcohol moiety which may be carbonylated by the process of the present invention may suitably be saturated aliphatic or aromatic alcohols or derivatives thereof. By "alcohol derivatives" is meant here and throughout the specification derivatives of alcohols such as esters, symmetrical ethers and alkyl halides. Suitable alcohols which may be used in the process of the present invention include methanol, ethanol, propanol or butanol. Preferably the alcohol is methanol which may be carbonylated to produce acetic acid.

The cationic complexes which may be employed as catalysts in the process of the present invention are univalent or trivalent rhodium or iridium compounds as defined below, or compounds of rhodium or iridium which form the catalysts defined below under reaction conditions. Univalent rhodium and iridium catalysts are of the general formula $(ML_m(CO)_nS_l)_k$ A wherein M is Rh or Ir, L is a stabilising ligand as defined below, CO is a carbonyl ligand, S is a solvent ligand $m$, $n$, and $l$ are integers from 0 to 5 such that $n + m + l \leq 5$, A is an anion other than halide and is stable under the reaction conditions, and $k$ is an integer. Trivalent rhodium or iridium compounds are of the general formula $(ML_s(CO)_tS_uR_pX_q)_kA$ wherein M, L, CO, S, k and A are as defined above, X is an iodide or bromide ligand, $s$, $t$ and $u$ are integers from 0 to 4 such that $s + t + u \leq 4$, $p$ and $q$ are integers such that when $p = 1$, $q = 1$, when $p = 2$, $q = 0$, and when $p = 0$, $q = 2$, R is hydrogen or an alkyl or an aryl radical. R may be a substituted or unsubstituted alkyl or aryl group containing 1 to 20 carbon atoms when it is an alkyl group, and 6 to 20 carbon atoms when it is an aryl group.

Compounds of rhodium or iridium which form the catalysts defined above under reaction conditions may be cationic complexes of univalent or trivalent rhodium or iridium which contain ligands which are displaced under reaction conditions. They may also be neutral and/or halide compounds of univalent or trivalent rhodium or iridium which, under reaction conditions, react with metal salts of suitable anions (defined below), and/or with the acids from which these salts are derived to give the required catalysts. Thus, the cationic complex catalyst may be formed "in situ".

Suitable metals from which the salt derivatives of the anions are obtained include the alkali metals, e.g. sodium, lithium, and potassium. Suitable ligands which are displaced under reaction conditions include olefins and diolefins, e.g. ethylene, propylene, cycloocta-1,5-diene, norbornadiene etc., donor solvents, e.g. acetonitrile, benzonitrile, dimethylsulphoxide, etc., and aromatic compounds, e.g. benzene, toluene, hexamethylbenzene, etc.

The anion A is a moiety, other than a halide, which has an integral number of negative charges, which may occupy from 0 to 4 co-ordination sites of the metals and which is stable under the reaction conditions. Examples of suitable anions are tetraaryl borates ($BAr_4$, where Ar is a substituted or unsubstituted aryl group containing 6 to 20 carbon atoms) phosphates ($PO_4^{3-}$, $HPO_4^{2-}$, $H_2PO_4^-$), sulphates ($SO_4^{2-}$, $HSO_4^-$, perchlorate ($ClO_4^-$), borate, iodate, bromate, etc.

Most preferably the complexes are:
$(M(P(OPh)_3)_r)_k$ A and $(M(PPh_3)_r)_k$A
wherein $r$ is an integer which is 2, 4 or 5 and $k$ is an integer.

Examples of the cationic complexes which may be employed as catalysts, or of complexes which form these cationic rhodium and iridium catalysts under the reaction conditions of the present invention are:

$M(P(OPh)_3)_4BPh_4$
$M(PPh_3)_4H_2PO_4$
$MH_2(P(OPh)_3)_4BPh_4$
$MI_2(P(OPh)_3)_4ClO_4$
$M(PPh_3)_2BPh_4$
$MCO(PPh_3)_3ClO_4$
$M(COD)BPh_4$
$M(COD)_2IO_3$
$M(COD))C_6H_6) B(C_6H_5CH_3)_4$
$(M(COD) (DMSO)_2)_3PO_4$
$M(COD)(CH_3CN)_2IO_3$
$M(NBD)(C_6Me_6) BrO_3$
$MCl_3/NaBPh_4$
$M(CO)Cl(PPh_3)_2/Na_3PO_4$
$(M(COD)I)_2/H_3PO_4(M(CO)_2Cl)_2/NA_2SO_4$
$(M(P(OPh)_3)_4Cl/H_2SO_4$
$(M(C_2H_4)_2Cl)_2/NaHPO_4$ wherein M is Rh or Ir, COD is cycloocta-1,5-diene, NBD is norbornadiene and DMSO is dimethyl sulphoxide.

In carrying out the process of the present invention an excess of the stabilising ligand may be present to assist in maintaining the metal species cationic under the reaction conditions. The stablizing ligand will be a compound containing one or more atoms capable of donating electrons, e.g. a ligand containing nitrogen, phosphorous, arsenic, or antimony atoms, or an aromatic compound. Examples of suitable stabilishing ligands are acetonitrile, benzonitrile, n-butyl isocyanate, benzene, toluene, hexamethylbenzene and aryl phosphines or phosphites such as triphenyl phosphine or triphenyl phosphite. The phosphines and phosphites are particularly preferred. Where such stabilising ligands are used it is preferable to maintain a ligand molecule to metal atom ratio of at least 2:1, preferably between 2 and 200:1 and most preferably between 2 and 20:1.

The carbonylation reactions of the present invention are normally carried out in the liquid phase. They are preferably carried out in a homogeneous liquid phase.

When the reaction is carried out in a homogeneous liquid phase the cationic complex catalyst is employed in a solution of a solvent or mixture of solvents compatible with the reaction system. Suitable examples of compatible solvents which may be employed are carboxylic acids such as acetic acid and propionic acid especially the carboxylic acid which is the reaction product, and/or the alcohol feedstock, and/or an ether formed from the alcohol feedstock, and/or esters of the alcohol feedstock, and the carboxylic acid product, nitriles such as acetonitrile, benzonitrile, sulpholane and similar polar solvents which are stable under the reaction conditions. Other organic compounds may also be present e.g. ketones and hydrocarbons. Water may also be added to the reaction mixture to exert a beneficial effect on the reaction rate.

The reaction rate is dependent upon catalyst concentration. Thus, concentrations of the cationic complex catalyst in the liquid phase may be between $10^{-6}$ mole/litre and $10^{-1}$ mole/litre, preferably between $10^{-4}$ mole/litre and $10^{-2}$ mole/litre. Higher concentrations even to the extent of 1 mole/litre may be used if desired. Higher temperatures also favour higher reaction rates.

If desired, the activity of the cationic complex catalyst may be enhanced by adding a suitable promoter thereto. Such promoters are preferably a halogen or a halide, but those containing iodine or bromine are preferred. Suitable compounds containing a halogen or a halide which may be used as promoter for the catalyst of the present invention are hydrogen halides, alkyl and aryl halides and metal halides. Hydrogen iodide, hydrogen bromide, alkyl and aryl iodides and bromides, metal iodides and bromides are particularly suitable. Preferably an alkyl halide with 1 to 20 carbon atoms is used. Although any ratio of promoter to the cationic complex catalyst may be used, ratios generally employed are in the range of between 1:1 to 3000:1 based on the atoms of halogen in the promoter to the atoms of the metal in the cationic complex catalyst. It is preferable that the ratio of halogen atoms in the promoter to the metal in the cationic complex is in the range 3:1 to 1500:1.

In carrying out the process of the present invention the cationic complex catalyst may, if desired, be deposited on a suitable support. Suitable examples of supports which may be employed include silica, silica-alumina, alumina, zeolites, etc. If desired the cationic complex catalyst may be chemically bonded to the support via a group containing at least one atom capable of donating electrons which can also act as a stabilising ligand.

The carbonylation reaction of the present invention is suitably carried out at a temperature above 50°C., preferably between 50° and 300°C., and most preferably between 150° and 250°C.

In accordance with the present invention the carbonylation may be carried out over moderately wide range of pressures, e.g. 1 to 15,000 psig. It is preferably between 5 to 3000 and most preferably between 10 to 1000 psig.

The carbonmonoxide employed in this carbonylation process may be present in quantities greater or less than equimolar compared with the number of hydroxyl groups to be carbonylated. Carbon monoxide streams containing impurities such as hydrogen, nitrogen, carbon dioxide and saturated compounds containing 1 to 4 carbon atoms may also be usefully employed. The concentration of carbon monoxide in the feed gas may range from 1% v/v to 99.9 v/v, preferably from 10% v/v to 99.9% v/v. The total reactor pressure will then have to be increased in order to maintain the desired carbon monoxide partial pressure with these streams.

The invention is further illustrated with reference to the following examples: The comparative examples included demonstrate the rate advantage obtained by using a cationic catalyst in the reaction.

EXAMPLE 1

A 500 cm³ rocking autoclave was charged with

| | |
|---|---|
| Rh(P(OPh)₃)₄BPh₄ | $1.5 \times 10^{-3}$ mole. |
| triphenylphosphite | $1.2 \times 10^{-2}$ mole. |
| iodomethane | 29g. |
| methanol | 79g. |
| propionic acid | 187g. | flushed with nitrogen, then pressurised with carbon monoxide. The autoclave was heated to 176°C and the pressure maintained at 65 bar (ga) by the addition of carbon monoxide at a rate of 47.5 bar. h⁻¹ (measured between 10 and 60% conversion of methanol). When carbon monoxide absorption ceased the autoclave was cooled to room temperature and the contents were analysed by gas chromatography. This showed the methanol conversion to acetic acid to be greater than 95%.

In this example the reaction was carried out until substantially complete conversion of the methanol had taken place. In subsequent examples the reactions were often carried out to lower conversions for convenience only.

EXAMPLE 2

A 500 cm³ rocking autoclave was charged with

| | |
|---|---|
| Rh (P(OPh)₃)₄BPh₄ | $1.5 \times 10^{-4}$ mole. |
| triphenylphosphite | $1.2 \times 10^{-3}$ mole. |
| iodomethane | 29g. |
| methanol | 79g. |
| propionic acid | 187g. | flushed with nitrogen, then pressurised with carbon monoxide. The autoclave was heated to 176°C and the pressure maintained at 65 bar (ga) by the addition of carbon monoxide at a rate of about 4.5 bar. h⁻¹. After 380 minutes the autoclave was cooled to room temperature and the contents were analysed by gas chromatography. The combined weights of methyl acetate and acetic acid represented a total acetic acid yield of 30g.

EXAMPLE 3

| Rh (P(OPh)₃)₄BPh₄ | 4 × 10⁻⁴ mole, |
|---|---|
| triphenylphosphite | 3.2 × 10⁻³ mole, |
| iodomethane | 29g, |
| methanol | 79g, |
| propionic acid | 187g, | flushed with nitrogen, then pressurised with carbon monoxide. The autoclave was heated to 176°C and the pressure maintained at 65 bar(ga) by the addition of carbon monoxide at a rate of about 9.0 bar, h⁻¹. After 380 minutes the autoclave was cooled to room temperature and the contents were analysed by gas chromatography. The combined weights of methyl acetate and acetic acid represented a total acetic acid yield of 60g.

In a comparative experiment a 500 cm³ rocking autoclave was charged with

| RhCl₃.3H₂O | 4 × 10⁻⁴ mole, |
|---|---|
| triphenylphosphite | 4.8 × 10⁻³ mole, |
| iodomethane | 29g, |
| methanol | 79g, |
| propionic acid | 187g, | flushed with nitrogen, then pressurised with carbon monoxide. The autoclave was heated to 175°C anh the pressure maintained at 65 (bar (ga) by the addition of carbon monoxide at a rate of about 7.5 bar. h⁻¹. After 380 minutes the autoclave was cooled to room temperature and the contents was analysed by gas chromatography. The combined weights of methylacetate and acetic acid represented a total acetic acid yield of 52g.

EXAMPLE 4

A 500 cm³ rocking autoclave was charged with

| Rh (P(OPh)₃)BPh₄ | 1.5 × 10⁻⁴ mole, |
|---|---|
| triphenylphosphite | 1.2 × 10⁻³ mole, |
| iodomethane | 29g, |
| methanol | 79g, |
| acetic acid | 197g. | flushed with nitrogen, then, presurised with carbon monoxide. The autoclave was heated to 177°C and the pressure maintained at 65 bar(ga) by the addition of carbon monoxide at a rate of about 4.5 bar h⁻¹ (measured between 10 and 80% conversion of methanol). When carbon monoxide absorption ceased the autoclave was cooled to room temperature and the contents were analysed by gas chromatography. This showed the methanol conversion to acetic acid to be greater than 90%.

In a comparative experiment a 500 cm³ rocking autoclave was charged with

| RhCl₃.3H₂O | 1.5 × 10⁻⁴ mole, |
|---|---|
| triphenylphosphite | 1.8 × 10 mole, |
| iodomethane | 29g, |
| methanol | 79g, |
| acetic acid | 197g. | flushed with nitrogen, then pressurised with carbon monoxide. The autoclave was heated to 177°C and the pressure maintained at 65 bar(ga) by the addition of carbon monoxide at a rate of about 3.5 bar, h⁻¹, (measured between 10 and 80% conversion of methanol). When carbon monoxide absorption ceased the autoclave was cooled to room temperature and the contents was analysed by gas chromatography. This showed the methanol conversion to acetic acid to be greater than 90%.

EXAMPLE 5

A 500 cm³ rocking autoclave was charged with

| Rh(P(OPh)₃)₄BPh₄ | 1.5 × 10⁻⁴ mole, |
|---|---|
| triphenylphosphite | 1.2 × 10⁻³ mole, |
| iodomethane | 29g, |
| methane | 79g, |
| acetic acid | 157g, |
| water | 40g. | flushed with nitrogen, then pressurised with carbon monoxide. The autoclave was heated to 176°C and the pressure maintained at 65 bar(ga) by the addition of carbon monoxide at a rate of about 9.0 bar. h⁻¹. After 720 minutes the autoclave was cooled to room temperature and the contents were analysed by gas chromatography. The combined weights of methylacetate and acetic acid represented a total acetic acid yield of 90g.

In a comparative experiment a 500 cm³ rocking autoclave was charged with

| RhCl₃.3H₂O | 1.5 × 10⁻⁴ mole, |
|---|---|
| triphenylphosphite | 1.8 × 10⁻³ mole, |
| iodomethane | 29g, |
| methanol | 79g, |
| acetic acid | 157g, |
| water | 40g, | flushed with nitrogen, then pressurised with carbon monoxide. The autoclave was heated to 176°C and the pressure maintained at 65 bar(ga) by the addition of carbon monoxide at a rate of about 7.5 bar. h⁻¹. After 720 minutes the autoclave was cooled to room temperature and the contents was analysed by gas chromatography. The combined weights of methyl acetate and acetic acid represented a total acetic acid yield of 67g.

EXAMPLE 6

A 500 cm³ rocking autoclave was charged with

| ((COD)RhI)₂ | 0.75 × 10⁻⁴ mole, |
|---|---|
| triphenylphosphite | 1.8 × 10⁻³ mole, |
| Na₃PO₄.12H₂O | 0.75 × 10⁻⁴ mole, |
| acetic acid | 197g, |
| iodomethane | 29g, |
| methanol | 79g, | flushed with nitrogen, then pressurised with carbon monoxide. The autoclave was heated to 175°C and the carbon monoxide pressure increased to 65 bar(ga). The autoclave was maintained at 175°C and the reaction followed by carbon monoxide absorption. The rate of carbon monoxide absorption from about 10% to about 50% reaction was 6.0 bar. h⁻¹. (COD is cycloocta-1, 5-diene).

In a comparative experiment a 500 cm³ rocking autoclave was charged with

| ((COD)RhI)₂ | 0.75 × 10⁻⁴ mole, |
|---|---|
| triphenylphosphite | 1.8 × 10⁻³ mole, |
| acetic acid | 197g, |
| iodomethane | 29g, |
| methanol | 79g, | flushed with nitrogen, then pressurised with carbon monoxide. The autoclave was heated to 175°C and the carbon monoxide pressure increased to 65 bar(ga). The autoclave was maintained at 175°C and the reaction followed by the carbon monoxide gas absorption. The rate of carbon monoxide absorption from about 10% to about 50% of reaction was 4.5 bar. h$^{-1}$.

EXAMPLE 7

A 500 cm$^3$ rocking autoclave was charged with

| | |
|---|---|
| ((COD)RhI)$_2$ | 0.75 × 10$^{-4}$ mole, |
| triphenylphosphite | 1.8 × 10$^{-3}$ mole, |
| Na$_3$PO$_4$.12H$_2$O | 1.5 × 10$^{-4}$ mole, |
| acetic acid | 179g, |
| iodomethane | 29g, |
| methanol | 79g. | flushed with nitrogen, then pressurised with carbon monoxide, The autoclave was heated to 176°C and the carbon monoxide pressure increased to 65 bar(ga). The autoclave was maintained at 176°C and the reaction followed by carbon monoxide absorption. The rate of carbon monoxide absorption from about 10% to about 50% reaction was 6.5 bar. h$^{-1}$.

EXAMPLE 8

A 500 cm$^3$ rocking autoclave was charged with

| | |
|---|---|
| ((COD)Rh I)$_2$ | 0.75 × 10$^{-4}$ mole, |
| triphenylphosphite | 1.8 × 10$^{-3}$ mole, |
| phosphoric acid (88% H$_3$PO$_4$) | 0.75 × 10$^{-4}$ mole, |
| acetic acid | 197g, |
| iodomethane | 29g, |
| methanol | 79g, | flushed with nitrogen, then pressurised with carbon monoxide. The autoclave was heated to 175°C and the carbon monoxide pressure increased to 65 bar(ga). The autoclave was maintained at 175°C and the reaction followed by the carbon monoxide gas absorption. The rate of carbon monoxide absorption from about 10% to about 50% reaction was 5.6 bar. h$^{-1}$.

EXAMPLE 9

A 500 cm$^3$ rocking autoclave was charged with

| | |
|---|---|
| Rh(P(OPh)$_3$)$_4$BPh$_4$ | 1.5 × 10$^{-4}$ mole, |
| triphenylphosphite | 1.2 × 10$^{-3}$ mole, |
| acetic acid | 103g, |
| sulpholane | 124.5g, |
| methanol | 79g, |
| iodomethane | 29g, | flushed with nitrogen, then pressurised with carbon monoxide. The autoclave was heated to 175°C and the carbon monoxide pressure increased to 65 bar(ga). The autoclave was maintained at 175°C and the reaction followed by the carbon monoxide gas absorption. The rate of carbon monoxide absorption from about 10% to about 50% reaction was 8.4 bar. h$^{-1}$. This experiment demonstrates the rate advantage obtained by using a polar solvent for this reaction.

In a comparative experiment a 500 cm$^3$ rocking autoclave was charged with

| | |
|---|---|
| RhCl$_3$.3H$_2$O | 1.5 × 10$^{-4}$ mole, |
| triphenylphosphite | 1.8 × 10$^{-3}$ mole, |
| acetic acid | 103g, |
| sulpholane | 124.5g, |
| methanol | 79g, |
| iodomethane | 29g, | flushed with nitrogen, then pressurised with carbon monoxide. The autoclave was heated to 175°C and the carbon monoxide pressure to 65 bar(ga). The autoclave was maintained at 175°C and the reaction followed by the carbon monoxide gas absorption. The rate of carbon monoxide absorption from about 10% to about 50% reaction was 6.9 bar. h$^{-1}$. This experiment demonstrates the rate advantage obtained by using a polar solvent for this reaction.

We claim:

1. A process for the carbonylation of an alcohol or an alcohol derivative chosen from the group consisting of esters, symmetrical ethers and alkyl halogens containing from 1 to 20 carbon atoms per molecule in the alcohol moiety to produce a carboxylic acid having one more carbon atom per molecule than that in the alcohol moiety of the alcohol or alcohol derivative comprising reacting said alcohol or said alcohol derivative with carbon monoxide at a temperature between 50° and 300°C in the presence of a cationic complex catalyst selected from the group consisting of cationic complex of univalent rhodium, univalent iridium, trivalent rhodium and trivalent iridium, containing a stabilizing ligand selected from the group consisting of acetonitrile, benzonitrile, n-butyl isocyanate, benzene, toluene, hexamethyl benzene, an aryl phosphite or an aryl phosphine, and wherein the anionic moiety in the cationic complex catalyst is a radical selected from the group consisting of phosphates, sulphates, perchlorates, borates, iodates, and bromates, and optionally, a promoter selected from the group consisting of bromine, iodine, a hydrogen halide, an alkyl halide, an aryl halide, and a metal halide.

2. A process according to claim 1 wherein the stabilizing ligand is selected from the group consisting of triphenyl phosphite and triphenyl phosphine.

3. A process according to claim 1 wherein the ratio of the stabilizing ligand to the metal atom in the cationic complex catalyst is at least 2:1.

4. A process according to claim 1 wherein the cationic complex is a complex of univalent rhodium or iridium having the general formula $(ML_m(CO)_nS_1)_kA$ wherein M is Rh or Ir, L is the stabilizing ligand, CO is a carbonyl ligand, S is a solvent ligand selected from the group consisting of acetonitrile, benzonitrile, dimethyl sulfoxide, benzene, toluene, and hexamethyl benzene, $m$, $n$, and $l$ are integers from 0 to 5 such that $n+m+L=5$, A is the anionic moiety and is stable under the reaction conditions, and K is an integer.

5. A process according to claim 1 wherein the cationic complex is a complex of trivalent rhodium or iridium having the general formulal $(ML_s(CO)_tS_uR_pX_q)_kA$ wherein M is Rh or Ir, L is the stabilizing ligand, CO is a carbonyl ligand, S is a solvent ligand selected from the group consisting of acetonitrile, benzonitrile, dimethyl sulfoxide, benzene, toluene, and hexamethyl benzene, A is the anionic moiety and k is an integer, X is an iodide or bromide ligand, $s$, $t$, and $u$ are integers from 0 to 4 such that $s + t + u = 4$, $p$ and $q$ are integers such that when $p=1$, $q=1$, when $p=2$, $q=0$, and when $p=0$, $q=2$, R is hydrogen or a substituted or unsubstituted alkyl or aryl group such that it contains 1 to 20 carbon atoms when it is an alkyl group and 6 to 20 carbon atoms when it is an aryl group.

6. A process according to claim 1 wherein the anionic moiety in the cationic complex is a tetra aryl borate.

7. A process according to claim 1 wherein the cationic complex catalyst is employed in the carbonylation reaction as a solution in a solvent compatible with the reaction system said solvent being selected from aliphatic carboxylic acids, alcohols, ethers, esters, nitriles, sulpholane and mixtures thereof.

8. A process according to claim 7 wherein the solvent is selected from the alcohol feedstock being carbonylated, the ether of the alcohol feedstock being carbonylated, the reaction product of the carboxylation reaction, ester of the alcohol feedstock and the carboxylic acid product, acetonitrile and benzonitrile.

9. A process according to claim 7 wherein the concentration of the cationic complex catalyst in the liquid phase is between $10^{-6}$ mole/litre and $10^{-1}$ mole/litre.

10. A process according to claim 1 wherein the cationic complex catalyst is formed "in situ".

11. A process according to claim 1 wherein a promoter selected from the group consisting of bromine, iodine, a hydrogen halide, an alkyl halide, an aryl halide, and a metal halide, is added to the cationic complex catalyst.

12. A process according to claim 11 wherein the ratio of the halogen atoms in the promoter to the metal atoms in the cationic complex catalyst is in the range of 1:1 to 3000:1.

13. A process according to claim 1 wherein the cationic complex catalyst is deposited on a support selected from the group consisting of alumina, silica-alumina and zeolites.

14. A process according to claim 1 wherein the carbonylation is carried out at a pressure in the range 5 to 3000 p.s.i.g.

* * * * *

UNITED STATES PATENT OFFICE
CERTIFICATE OF CORRECTION

PATENT NO. : 3,923,880
DATED : December 2, 1975
INVENTOR(S) : DAVID JACK WESTLAKE and MICHAEL JOHN WRIGLESWORTH It is certified that error appears in the above-identified patent and that said Letters Patent are hereby corrected as shown below:

Col. 2, line 35, after $HPO_4^2$ delete the single bond and insert a double bond (=); same line after "$HSO_4-$" close the parenthesis --)--.

line 61, penultimate formula, delete the opening parenthesis --(-- before "M".

Col. 2, line 67; Col. 3, lines 1 and 5, in each occurrence, correct the spelling of "stabilizing".

Col. 5, line 28, correct the spelling of "and"

line 29, delete the opening parenthesis --(-- before "bar"

Col. 8, line 22, "complex" should read --complexes--.

Signed and Sealed this

Twentieth Day of July 1976

[SEAL]

Attest:

RUTH C. MASON
*Attesting Officer*

C. MARSHALL DANN
*Commissioner of Patents and Trademarks*